United States Patent
Danguy et al.

(10) Patent No.: US 9,435,347 B2
(45) Date of Patent: Sep. 6, 2016

(54) TURBOPUMP, IN PARTICULAR FOR FEEDING ROCKET ENGINES

(75) Inventors: Francois Danguy, Tourny (FR); Laurent Fabbri, Gasny (FR); Sebastien Guingo, Pacy sur Eure (FR)

(73) Assignee: SNECMA, Paris (FR)

( * ) Notice: Subject to any disclaimer, the term of this patent is extended or adjusted under 35 U.S.C. 154(b) by 803 days.

(21) Appl. No.: 13/820,308

(22) PCT Filed: Aug. 31, 2011

(86) PCT No.: PCT/FR2011/052001
§ 371 (c)(1),
(2), (4) Date: May 8, 2013

(87) PCT Pub. No.: WO2012/089943
PCT Pub. Date: Jul. 5, 2012

(65) Prior Publication Data
US 2013/0227931 A1 Sep. 5, 2013

(30) Foreign Application Priority Data
Sep. 3, 2010 (FR) .................................... 10 57013

(51) Int. Cl.
| F04D 29/047 | (2006.01) |
|---|---|
| F02K 9/46 | (2006.01) |
| F04D 7/02 | (2006.01) |
| F04D 13/04 | (2006.01) |
| F04D 29/049 | (2006.01) |

(52) U.S. Cl.
CPC ............... *F04D 29/047* (2013.01); *F02K 9/46* (2013.01); *F04D 7/02* (2013.01); *F04D 13/04* (2013.01); *F04D 29/049* (2013.01)

(58) Field of Classification Search
CPC .......... F02K 9/46; F02K 9/48; F04D 29/042; F04D 29/047; F04D 29/0473; F04D 29/049; F04D 27/057; F04D 29/14; F04D 7/02; F04D 13/04
See application file for complete search history.

(56) References Cited

U.S. PATENT DOCUMENTS

| 1,756,323 A | * | 4/1930 | Wilfley | ...................... F04D 7/06 |
|---|---|---|---|---|
| | | | | 415/217.1 |
| 2,475,316 A | | 7/1949 | Garraway | |

(Continued)

FOREIGN PATENT DOCUMENTS

| DE | EP 1477683 A2 * | 11/2004 | ......... F04D 13/0613 |
|---|---|---|---|
| GB | 727 649 | 4/1955 | |
| JP | H07-4381 | 1/1995 | |

OTHER PUBLICATIONS

Space Shuttle Main Engine Orientation [1998], Boeing, BC98-04.*

(Continued)

*Primary Examiner* — Phutthiwat Wongwian
*Assistant Examiner* — Jason H Duger
(74) *Attorney, Agent, or Firm* — Oblon, McClelland, Maier & Neustadt, L.L.P.

(57) ABSTRACT

A turbopump for feeding a low-thrust rocket engine comprises a pump, a turbine, and a common rotary shaft connected to the pump and to the turbine. First and second bearings closer respectively to the pump and to the turbine serve to support the common shaft. The second bearing is a hydrodynamic bearing connected to a gas supply source, and the turbopump also includes at least one dynamic sealing gasket around the shaft and interposed between the first and second bearings.

15 Claims, 5 Drawing Sheets

(56) References Cited

U.S. PATENT DOCUMENTS

| | | | |
|---|---|---|---|
| 2,750,892 A | | 6/1956 | Johnson |
| 2,839,005 A | | 6/1958 | Means |
| 3,581,504 A | * | 6/1971 | Andrus ................. F02K 9/48 |
| | | | 415/111 |
| 4,242,039 A | * | 12/1980 | Villard ............... F04D 29/2266 |
| | | | 415/112 |
| 4,255,095 A | | 3/1981 | Goulvestre et al. |
| 4,430,011 A | | 2/1984 | Kun |
| 5,209,652 A | | 5/1993 | Fischer et al. |
| 5,403,165 A | * | 4/1995 | Lehe ..................... F01D 11/22 |
| | | | 417/406 |
| 5,529,464 A | | 6/1996 | Emerson et al. |
| 6,058,715 A | * | 5/2000 | Strang ................... B64D 13/06 |
| | | | 62/172 |
| 7,391,125 B2 | * | 6/2008 | Ganev ..................... H02K 9/18 |
| | | | 290/1 A |
| 7,402,020 B2 | * | 7/2008 | Beers ..................... F04D 25/04 |
| | | | 415/1 |

OTHER PUBLICATIONS

International Search Report issued Nov. 4, 2011 in PCT/FR11/052001 Filed Aug. 31, 2011.

Office Action issued Mar. 7, 2016 in Japanese Patent Application No. 2013-526537 (in English language).

\* cited by examiner

TURBOPUMP, IN PARTICULAR FOR FEEDING ROCKET ENGINES

BACKGROUND OF THE DISCLOSURE

1. Field of the Disclosure

The present invention relates to turbopumps, and in particular turbopumps for feeding the combustion chambers of rocket engines with fuel and/or oxidizer propellants, and more particularly with cryogenic propellants.

2. Description of the Related Art

A turbopump comprises a pump and a turbine connected together by a common rotary shaft so that the rotation of the turbine rotor drives rotation of the pump rotor. Typically, in order to minimize the weight and the size of the turbopump, the common shaft is supported by first and second bearings, the first bearing being closer to the pump and the second bearing being closer to the turbine. The pump and turbine rotors are thus normally cantilevered out respectively from the first and second bearings.

Given the constraints to which turbopumps are normally subjected, in terms of speed of rotation, torque, and vibration, it is normally necessary to lubricate the bearings. A solution that has been generally adopted in the field of turbopumps for feeding propellants to rocket engines, and in particular cryogenic propellants, is to lubricate the bearings with the pumped fluid. Nevertheless, that presents the drawback of normally requiring a sealing barrier between the second bearing supporting the end of the shaft connected to the turbine and the turbine itself. Such a sealing barrier occupies a certain amount of space, thereby increasing the extent to which the turbine is cantilevered out, thereby penalizing the dynamic behavior of the shaft.

It is even more important to achieve sealing between the gas propelling the turbine and the pumped fluid when said gas and said fluid react chemically with each other. In particular, in turbopumps for feeding rocket engines with propellant, the gas propelling the turbine is normally a fuel gas, which generally requires absolute sealing within oxidizer turbopumps in order to separate the pumped oxidizer fluid from the fuel gas propelling the turbine. Under such circumstances, proposals have been made to lubricate the second bearing, i.e. the bearing supporting the shaft beside the turbine, not with the fluid that is pumped by the turbopump, but with a fuel fluid, and to separate this fuel fluid from the pumped oxidizer fluid that also lubricates the first bearing beside the pump, by using a dynamic gasket around the shaft between the two bearings, with an inert fluid being injected therein so as to provide absolute separation between the oxidizer and fuel fluid. That solution is nevertheless complex and difficult to incorporate in a turbopump of small dimensions. In addition, it does not spare the turbopump from the need to incorporate another sealing barrier between the second bearing and the turbine, with the drawbacks as mentioned above.

BRIEF SUMMARY OF THE DISCLOSURE

The present invention seeks to remedy those drawbacks. This object is achieved by the fact that, in a turbopump in at least one embodiment of the invention, the second bearing, i.e. the bearing closer to the turbine, is a hydrodynamic bearing connected to a supply source of gas that is compatible with the gas feeding the turbine, the turbopump also including a dynamic sealing gasket around the shaft, which gasket is interposed between said second bearing and the first bearing, i.e. the bearing closer to the pump.

By means of these arrangements, the second bearing no longer needs to be fed with a lubricant fluid distinct from the gas propelling the turbine. There is thus no longer any need to incorporate a sealing barrier between the second bearing and the turbine, thus making it possible to reduce significantly the extent to which it is cantilevered out.

Advantageously, the pump of the turbopump may be a cryogenic fluid pump. In this turbopump of the invention, since the second bearing is no longer necessarily fed with cryogenic fluid, this arrangement makes it possible to cool only a small portion of the turbopump, which portion is restricted to the pumps and their bearings. Furthermore, this makes it possible to minimize leaks of cryogenic fluid and to reduce consumption of the barrier gas, e.g. gaseous helium, during the period of cooling down the pump.

Advantageously, said pump is a propellant pump, in particular an oxidizer or a fuel propellant pump. This arrangement for the turbopump makes it possible to obtain compactness and lightness that are particularly advantageous in systems for feeding propellants, in particular for rocket engines, while also providing particularly advantageous sealing in the handling of chemically reactive fluids such as propellants.

Advantageously, said dynamic sealing gasket is connected to a source of inert fluid, so as to create a fluid barrier between the gas of the hydrodynamic bearing and the gas of the first bearing. Such a fluid barrier makes it possible to obtain a particularly high degree of sealing, and is therefore particularly advantageous when it is necessary to separate different fluids, e.g. because of their chemical reactivity.

Advantageously, said first bearing is connected to the pump to feed the first bearing with fluid coming from the pump. Thus, the pumped fluid can serve for lubricating the first bearing, thereby making it possible to maintain a comparatively simple arrangement for the turbopump that is reliable and light in weight and compact. Still more particularly, the first bearing may be a rolling bearing, providing very low resistance to rotation of the shaft, even at very high speeds of rotation, such as those that are normally to be found in an operating turbopump. Also more particularly, said pump may further include an auxiliary pump, preferably driven by said shaft, for evacuating said fluid from the first bearing. In particular, when the pump is a centrifugal pump, the auxiliary pump may be in the form of a backpump with blades formed on a rear face of a rotor of the pump. This makes it possible to direct the evacuation of the fluid, and in particular to return it to a main flow from the pump.

In a particularly advantageous embodiment of the present invention, said common shaft may be suitable for adopting a rest position in which it closes a static joint around said shaft, and for being moved axially from said rest position to a working position against a return force exerted by at least one resilient element. Thus, at rest, the static joint substantially prevents any leakage of fluid from the first bearing towards the dynamic gasket and the second bearing. In contrast, in the working position, the static joint no longer makes any contact, thereby avoiding friction. This arrangement thus makes it easier to fill the first bearing with the fluid prior to starting the turbopump. In particular, in cryogenic pumps, this makes it easier to cool the pump down before starting, while limiting leaks of cryogenic fluid.

The present invention also provides a method of using the turbopump, wherein the first bearing is lubricated by the fluid coming from the pump, said static joint substantially preventing said lubricating fluid from going towards the dynamic gasket and the second bearing when the turbopump is stopped, and then opening when the turbopump starts by virtue of the shaft moving axially towards the pump.

More particularly, said pump may present an axial admission passage situated at an end of the pump that is remote from said first bearing, and said working position is situated towards the pump relative to said rest position. After the turbopump has started, the axial force exerted on the shaft in reaction to the suction generated by the pump on its admission passage therefore moves the shaft towards the working position in automatic manner.

Still more advantageously, in order to define said working position, an element that is axially secured to the shaft but free to rotate relative to the shaft may come into abutment against a stator secured to a casing of the turbopump towards the pump in said working position. In particular, said element that is axially secured to the shaft but free to rotate relative to the shaft may be secured to an outer raceway of the first bearing.

Also still more advantageously, in order to define said rest position, an axial element secured to the shaft may come into abutment against a stator secured to the casing of the turbopump towards the turbine in said rest position.

In a first alternative, in particular when the turbine is a gas turbine that operates at moderate temperature, the gas supply source of the hydrodynamic bearing may be the turbine itself. This simplifies the arrangement of the turbine.

In a second alternative, in particular when the turbine is a turbine that operates with hot gas and the turbopump is a turbopump for feeding a propulsion chamber with propellant, said gas supply source of the hydrodynamic bearing may be an outlet from a regenerative circuit of the propulsion chamber.

The invention also provides a rocket engine having at least one turbopump of the invention for feeding at least one propulsion chamber of said rocket engine with at least one propellant, e.g. a fuel fluid and/or an oxidizer fluid.

Because of the compactness, the light weight, the reliability, and the simplicity of the turbopump of the invention, it is particularly advantageous for application to rocket engines, in particular to rocket engines of very low thrust, and those using cryogenic propellants.

BRIEF DESCRIPTION OF THE SEVERAL VIEWS OF THE DRAWINGS

The invention can well be understood and its advantages appear better on reading the following detailed description of embodiments shown as non-limiting examples. The description refers to the accompanying drawings, in which.

DETAILED DESCRIPTION OF THE DISCLOSURE

Figure 1:
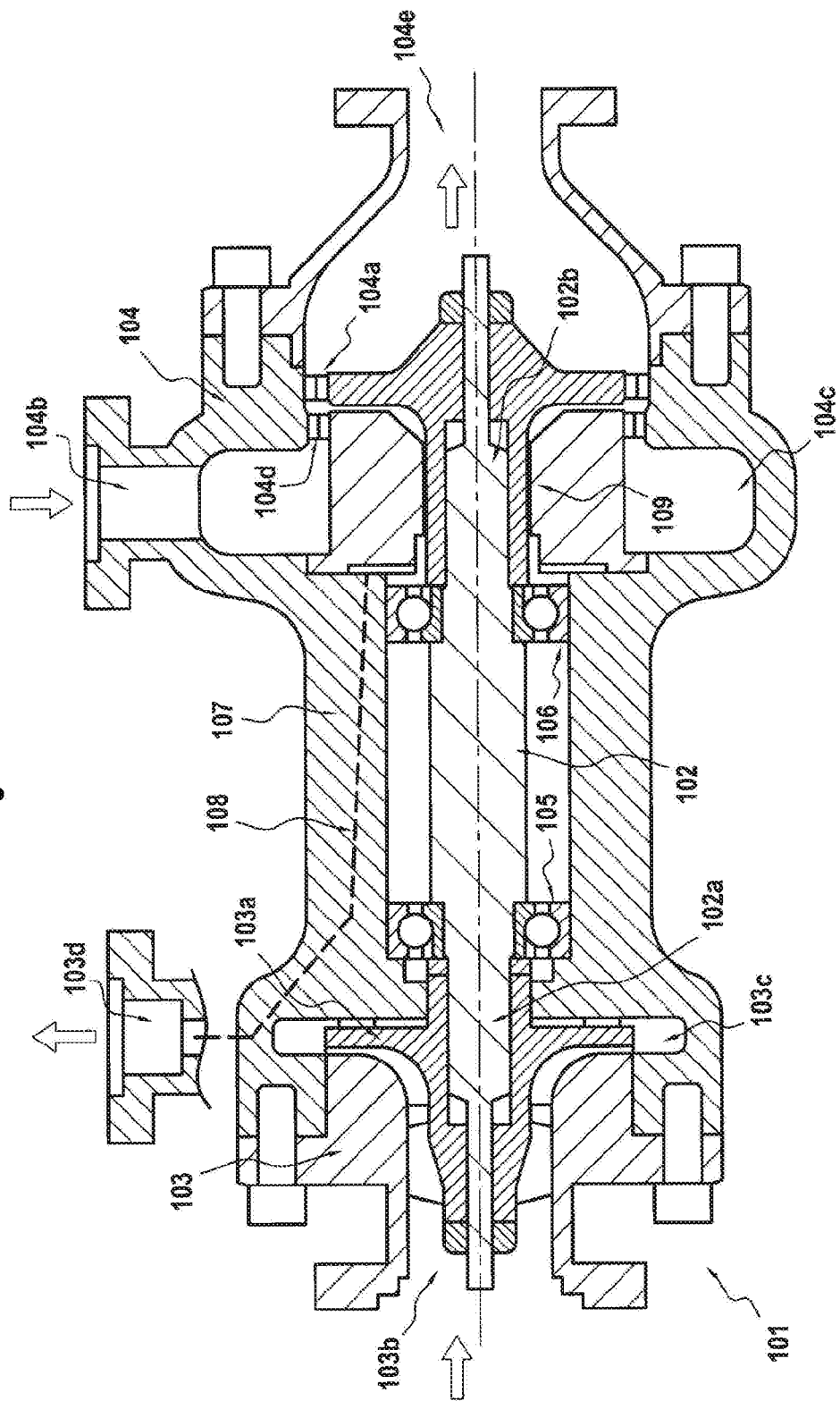
FIG. 1 is a longitudinal section view of a turbopump of the prior art for feeding a rocket engine combustion chamber with a cryogenic liquid fuel propellant.
Figure 2:
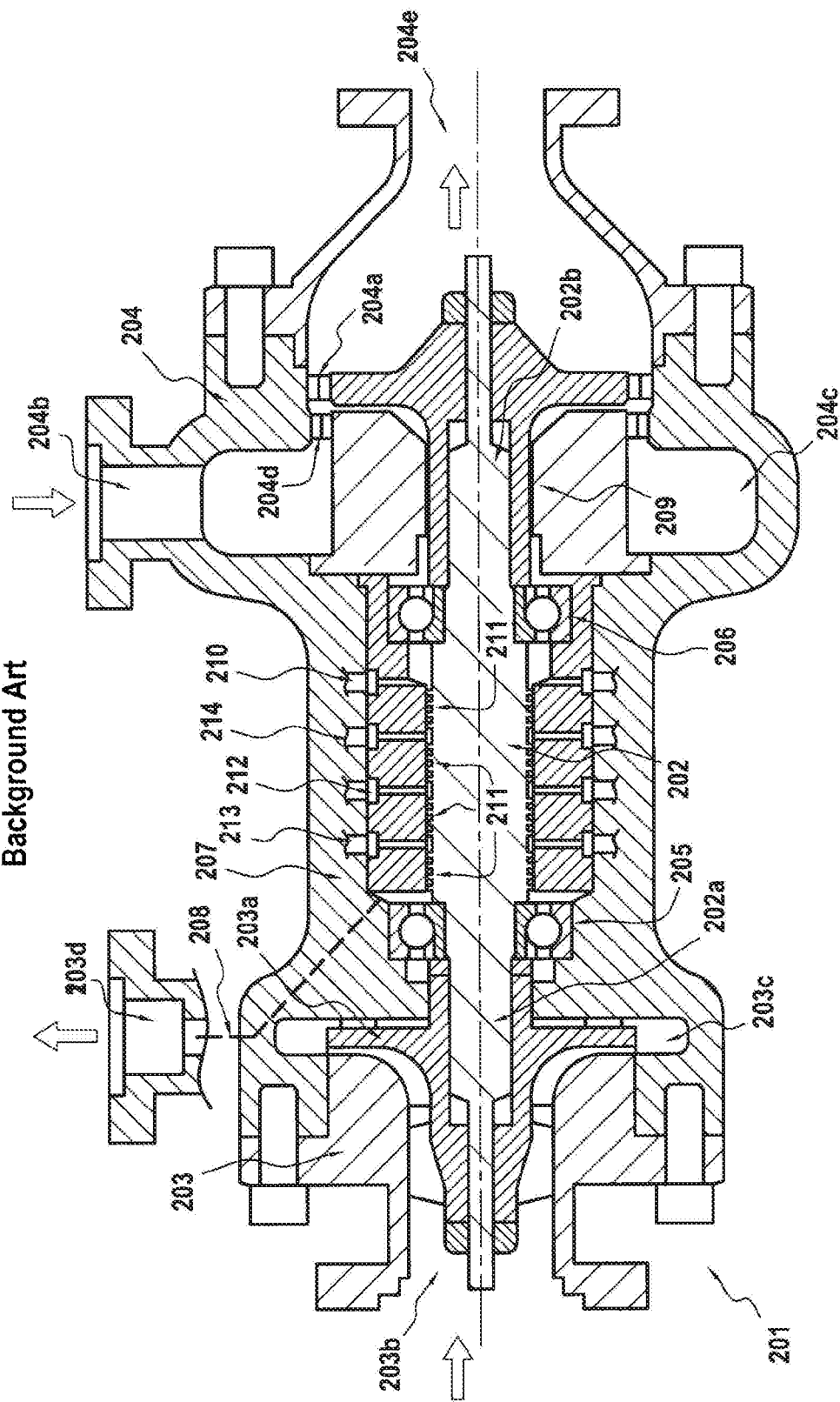
FIG. 2 is a longitudinal section view of a prior art turbopump for feeding a rocket engine combustion chamber with a cryogenic liquid oxidizer propellant.

In order to better understand the invention, the description begins with two turbopumps 101 and 201 of the prior art as shown in FIGS. 1 and 2. In the fuel propellant turbopump 101 shown in FIG. 1, a common shaft 102 connects the centrifugal pump 103 to the axial turbine 104. A first end 102a of the shaft 102 is secured to a rotor 103a of the pump 103, and a second end 102b of the shaft 102, opposite from said first end 102a, is secured to a rotor 104a of the turbine 104. Thus, the rotor 104a of the turbine 104 is propelled in rotation by the expansion of gas entering into the turbine via a radial admission duct 104b, an admission torus 104c, and a nozzle 104d, and leaving via an axial exhaust duct 104e, and this rotation drives the shaft 102 and the rotor 103a of the centrifugal pump 103 in rotation. The fuel propellant, driven by the rotor 103a, enters into the pump 103 via the axial admission passage 103b and leaves via the volute 103c and the exhaust tube 103d.

Two rolling bearings 105 and 106 support the shaft 102 in the casing 107 of the turbopump 101. The first bearing 105 supports the first end 102a of the shaft 102, while the second bearing 106 supports the second end 102b of the shaft 102, in such a manner that the pump 103 and the turbine 104 are cantilevered out respectively from the first bearing 105 and the second bearing 106.

In order to lubricate the bearings 105 and 106 and minimize friction between solid surfaces, a small flow 108 of liquid propellant under pressure is taken from the exhaust tube 103 and reinjected into the casing 107 of the turbopump 101 in order to immerse the bearings 105 and 106 in liquid. In order to limit losses of liquid propellant to the axial exhaust duct 104e of the turbine 104, a dynamic sealing gasket 109 separates the bearings 105 and 106 from the turbine 104. Nevertheless, this gasket 109 occupies a certain amount of space and causes the turbine 104 to be cantilevered out farther.

The oxidizer propellant turbopump 201 shown in FIG. 2 likewise presents a common shaft 202 connecting the centrifugal pump 203 to the axial turbine 204. As in the turbopump 101, a first end 202a of the shaft 202 is secured to a rotor 203a of the pump 203, and a second end 202b of the shaft 202, opposite from the first end 202a, is secured to a rotor 204a of the turbine 204.

In the turbopump 201, the centrifugal pump 203 also presents an axial admission passage 203b, a volute 203c, and an exhaust tube 203d. The turbine 204 also presents a radial admission duct 204b, an admission torus 204c, a nozzle 204d, and an axial exhaust duct 204e. The pump 203 and turbine 204 operate in analogous manner to the pump and the turbine in the turbopump 101, and as in the turbopump 101, the shaft 202 is also supported by two bearings 205 and 206 that leave the pump 203 and the turbine 204 cantilevered out. Nevertheless, in the oxidizer turbopump 201, it is more important to avoid any leaks of the propellant pumped by the pump 203 reaching the turbine 204 since the gas propelling the turbine 204 is usually a fuel gas and could react violently with the oxidizer propellant pumped by the pump 203.

Thus, in this turbopump 201, a small flow 208 of liquid propellant under pressure is likewise taken from the exhaust tube 203d and reinjected into the casing 207, however it is used only for lubricating the first bearing 205 adjacent to the pump 203. The second bearing 206 is lubricated by a small flow 210 of the fuel fluid, taken from elsewhere. As in the above-described turbopump 101, a dynamic sealing gasket 209 limits leaks of this fuel fluid towards the turbine 204. Nevertheless, in order to avoid contact between the flow 208 of oxidizer fluid and the flow 210 of fuel fluid, the turbopump 201 also presents between the first and second bearings 205 and 206: a plurality of dynamic sealing gaskets 211 around the shaft 202; an injection point 212 for injecting an inert fluid, such as helium, for example; and bleed points 213, 214 for bleeding off the oxidizer fluid and the fuel fluid respectively on opposite sides of the injection points 212. In this way, a fluid barrier is created between the oxidizer and fuel fluid.

Figure 3:
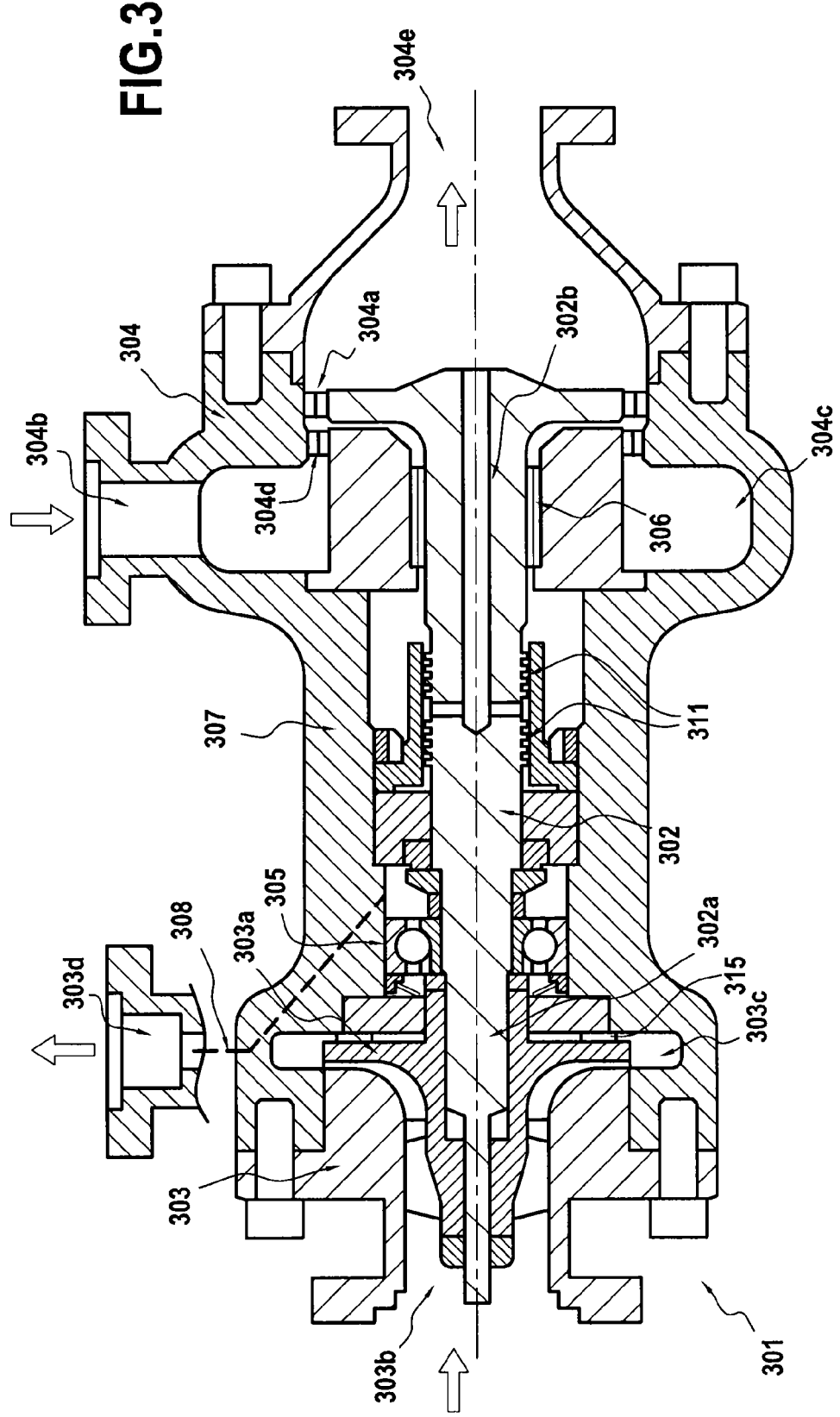
FIG. 3 is a section view of a turbopump in a first embodiment of the invention for feeding a rocket engine combustion chamber with a cryogenic liquid fuel propellant.
Figure 3A:
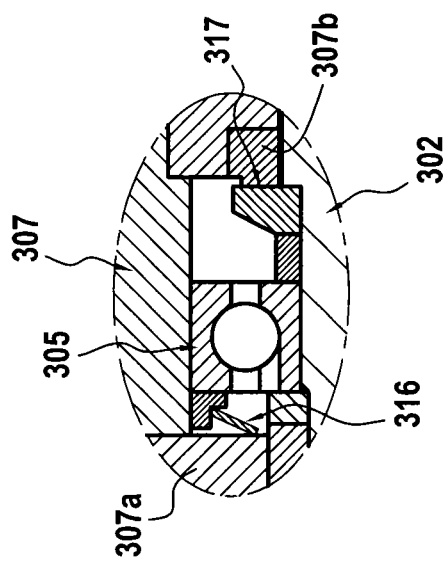
FIG. 3a is a detail view of the FIG. 3 turbopump in a rest position.
Figure 3B:
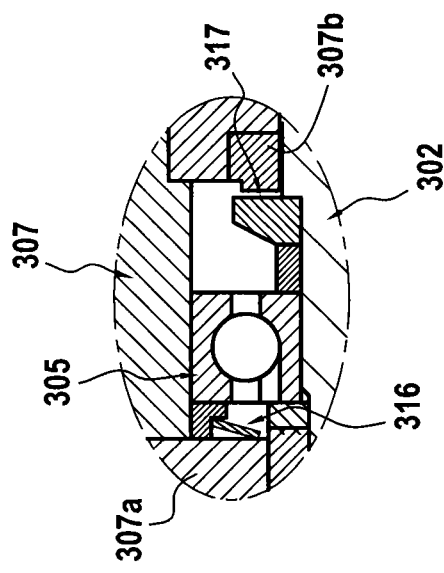
FIG. 3b is a detail view of the FIG. 3 turbopump in a working position.

These prior art turbopumps 101 and 201 nevertheless present a certain amount of complexity, including a turbine that is cantilevered out. In a first embodiment of the invention as shown in FIGS. 3, 3a, and 3b, the turbopump 301, which is a fuel propellant turbopump, also includes, like the prior art turbopump described above, a common shaft 302 connecting the centrifugal pump 303 to the axial turbine 304, with a first end 302a of the shaft 302 secured to a rotor 303a of the pump 303, and a second end 302b of the shaft 302, opposite from said first end 302a, secured to a rotor 304a of the turbine 304.

The centrifugal pump 303 also presents an axial admission passage 303b, a volute 303c, and an exhaust tube 303d, and the turbine 304 presents a radial admission duct 304b, an admission torus 304c, a nozzle 304d, and an axial exhaust duct 304e. The pump 303 and turbine 304 operate in a manner analogous to the pump and the turbine of the prior art turbopumps 101 and 201, and the shaft 302 is likewise supported by first and second bearings 305 and 306. A small flow 308 of liquid propellant under pressure is also taken from the exhaust tube 303d and reinjected into the casing 307 to lubricate the first bearing 305 beside the pump 303, which bearing is likewise a rolling bearing. This fluid is then evacuated to the volute 303c by a backpump 315 having blades formed on a rear face of the rotor 303a of the pump 303.

Nevertheless, in this turbopump 301 constituting a first embodiment of the invention, the second bearing 306 supporting the second end 302a of the shaft 302 close to the turbine 304 is a hydrodynamic bearing in which a thin stream of propellant gas for the turbine 304, taken from its admission torus 304c, prevents direct contact between facing solid surfaces. The use of a hydrodynamic bearing to support the shaft 302 radially at the turbine end 304 makes it possible to omit a dynamic sealing gasket between the second bearing 306 and the turbine 304. Also, because of its small radial extent, it enables the bearing 306 to be incorporated closer to the turbine rotor 304a, minimizing or even completely eliminating the cantilever of the rotor 304a relative to the bearing 306. In addition, because of this small radial extent, it also allows the shaft to be of large diameter in register with the bearing 306, which is also most favorable for the dynamic behavior of the shaft 302.

In the embodiment shown, the gas for the hydrodynamic bearing 306 is taken from the admission torus 304c, but in an alternative it could be taken from elsewhere, for example, if the temperature of the turbine propulsion gas is too high, from the outlet of a regenerator circuit of a propulsion chamber.

In order to separate the gas of the hydrodynamic bearing 306 from the liquid of the rolling bearing 305 while the turbopump 301 is in operation, this turbopump 301 includes dynamic sealing gaskets 311 around the shaft 302 between the rolling bearing 305 and the hydrodynamic bearing 306, with a bleed point leading to the axial exhaust duct 304e. Nevertheless, this turbopump 301 also includes a facial contact sealing device beside the first bearing 305 so as to provide additional sealing between the two bearings 305 and 306 when the turbopump 301 is stopped. The operation of this sealing device is shown in detail in FIGS. 3a and 3b.

In FIG. 3a, the sealing device can be seen in its rest position, while the turbopump 301 is stopped. A resilient element 316, specifically a spring washer interposed between an outer raceway of the bearing 305 and a stator 307a secured to the casing 307 of the turbopump 301 urges the bearing 305 together with the shaft 302 towards the turbine 304 into this rest position, in which an element that is axially secured to the shaft 302 comes into abutment against an opposite surface of a stator 307b secured to the casing 307 of the turbopump 301, thereby closing a seal 317 around the shaft 302 between the first bearing 305 and the dynamic sealing gaskets 311.

Thus, this static sealing device makes it easier to cool the bearing 305 down when at rest, and enables it to be immersed in cryogenic liquid without significant leakage towards the turbine 304. Nevertheless, when the turbopump 301 starts to operate, the suction exerted by the pump 303 on the axial admission passage 303b exerts axial traction through the rotor 303a on the shaft 302 towards the pump 303 and against the resilient element 316, thereby opening the static seal 317, and until coming into abutment against a stator 307a secured to the casing 307 towards the pump 303. This working position in which an element secured to the outer raceway of the bearing 305 is in abutment against a stator 307a secured to the casing 307 going towards the pump 303 is shown in FIG. 3b. Since the static seal 317 is thus open while the turbopump 301 is rotating normally, it generates no significant friction.

Figure 4A:
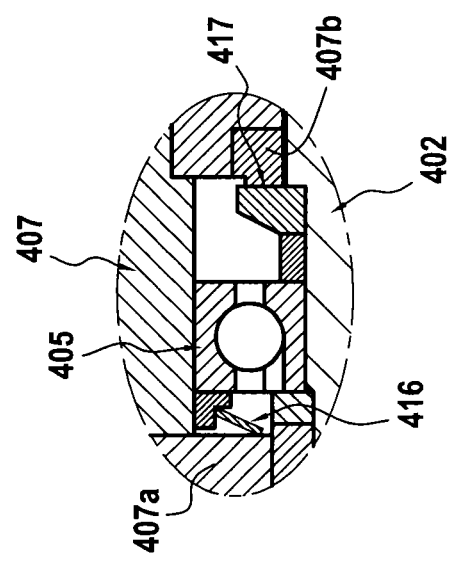
FIG. 4a is a detail view of the FIG. 4 turbopump in a rest position.
Figure 4B:
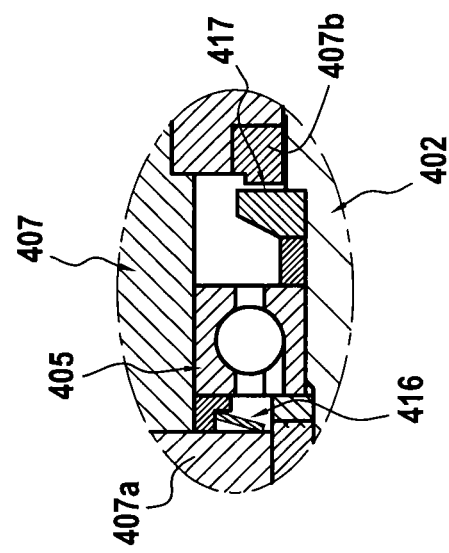
FIG. 4b is a detail view of the FIG. 3 turbopump in a working position.
Figure 4:
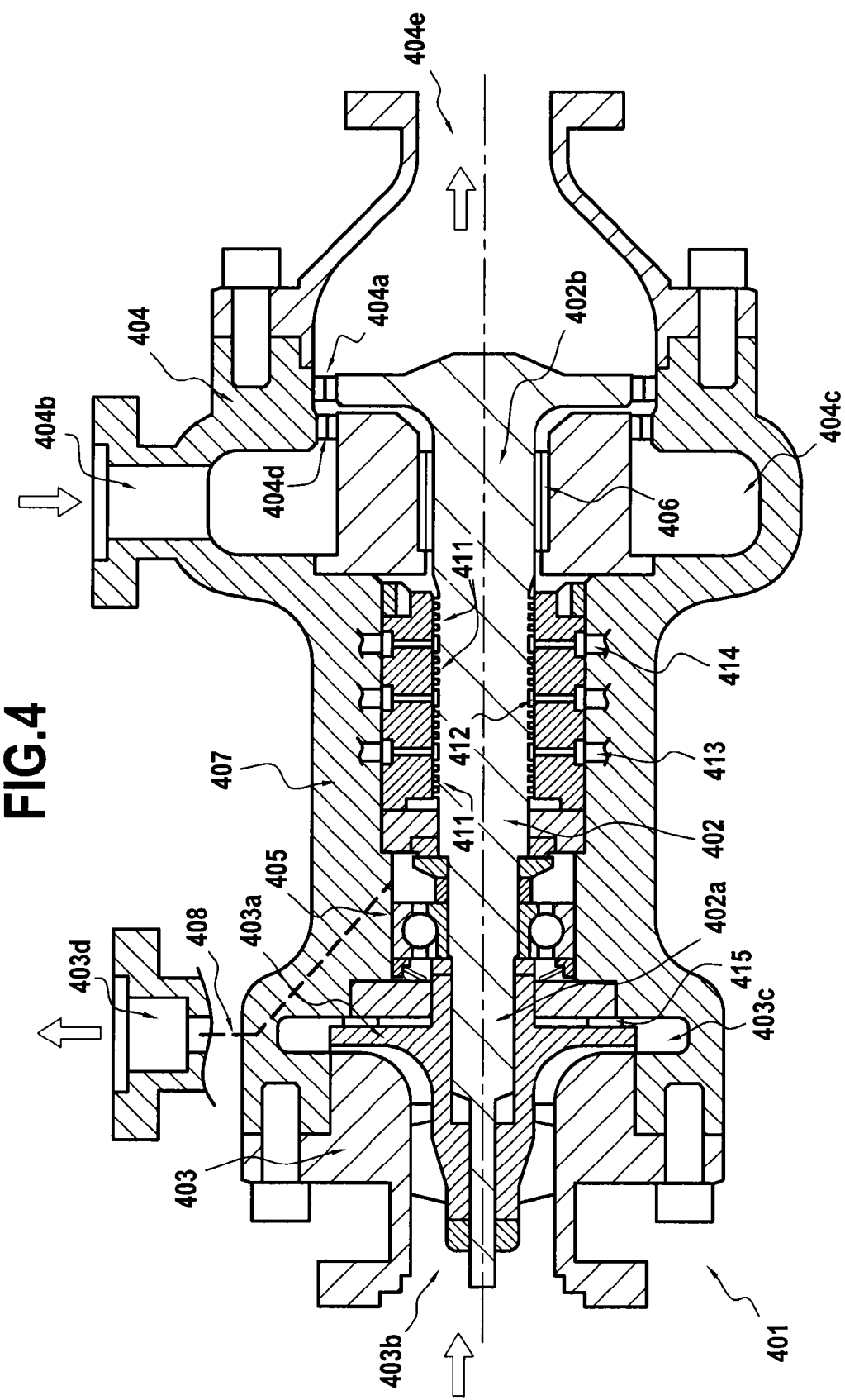
FIG. 4 is a section view of a turbopump in a second embodiment of the invention for feeding a rocket engine combustion chamber with a cryogenic liquid oxidizer propellant.

In a second embodiment of the present invention, as shown in FIGS. 4, 4a, and 4b, the turbopump 401 is an oxidizer propellant turbopump. Like the above-described turbopump, it likewise has a common shaft 402 connecting the centrifugal pump 403 to the axial turbine 404, with a first end 402a of the shaft 402 secured to a rotor 403a of the pump 403, and a second end 402b of the shaft 402, opposite from said first end 402a, being secured to a rotor 404a of the turbine 404.

The centrifugal pump 403 also presents an axial admission passage 403b, a volute 403c, and an exhaust tube 403d, and the turbine 404 presents a radial admission duct 404b, an admission torus 404c, a nozzle 404d, and an axial exhaust duct 404e. The pump 403 and the turbine 404 operate in a manner analogous to the pump and turbine of the above-described turbopumps, and the shaft 402 is likewise supported by first and second bearings 405 and 406. A small flow 408 of liquid propellant under pressure is also taken from the exhaust tube 403d and reinjected into the casing 407 in order to lubricate the first bearing 405 beside the pump 403, which is likewise a rolling bearing. This fluid lubricating the bearing 405 is also evacuated therefrom towards the volute 403c by a backpump 415 having blades formed on a rear face of the rotor 403a of the pump 403.

As in the first embodiment, the second bearing 406 supporting the second end 402a of the shaft 402 beside the turbine 404 is a hydrodynamic bearing in which a thin stream of gas for propelling the turbine 404 that is taken from its admission torus 404c prevents direct contact between facing solid surfaces. Alternatively, this gas can be taken from elsewhere, e.g., at the outlet from a regenerative circuit of a propulsion chamber, if the temperature of the turbine propulsion gas is too high.

In this second embodiment, the use of a hydrodynamic bearing presents the same advantages as in the first embodiment. Nevertheless, as in the prior art turbopump 201 shown in FIG. 2, it is important in this oxidizer turbopump 401 to provide very good sealing between the fuel gas of the hydrodynamic bearing 406 and the oxidizer fluid that is pumped by the pump 403. For this purpose, this turbopump 401 includes, between the rolling bearing 405 and the hydrodynamic bearing 406, firstly additional dynamic sealing gaskets 411 around the shaft 402, an injection point 412 for injecting an inert gas, such as helium for example, and bleed points 413, 414 for bleeding off the oxidizer fluid and the fuel gas respectively on either side of the injection point 412. This serves to create a fluid barrier between the oxidizer fluid and the fuel gas.

As in the first embodiment, this turbopump 401 also includes a facial contact sealing device beside the first bearing 405, providing additional sealing between the two bearings 405 and 406 when the turbopump 401 is stopped. The operation of this sealing device is shown in detail in FIGS. 4a and 4b and is analogous to the operation of the first embodiment, with a resilient element 416 urging the bearing 405 and the shaft 402 into a rest position as shown in FIG. 4a, towards the turbine 404 so as to close a seal 417 around the shaft 402 between the bearing 405 and the dynamic sealing gasket 411, and a working position as shown in FIG. 4b, in which the suction generated by the pump 403 at the axial admission passage 403b exerts traction on the pump rotor 403a and on the shaft 402, thereby moving the shaft 402 and the bearing 405 towards the pump 403 so as to open the seal 417.

The turbopumps 301 and 401 can be used in particular for feeding a propulsion chamber (not shown) of a rocket engine with propellant, and more specifically respectively with a cryogenic liquid fuel and a cryogenic liquid oxidizer. They are particularly suitable for feeding low thrust rocket engines.

Although the present invention is described above with reference to specific embodiments, it is clear that various modifications and changes may be implemented on those embodiments without going beyond the general scope of the invention as defined by the claims. Consequently, the description and the drawings could be considered in a sense that is illustrative rather than restrictive.

The invention claimed is:
1. A turbopump, comprising:
a propellant pump;
a turbine;
a common rotary shaft connected to said propellant pump and to said turbine;
a first bearing and a second bearing, the first and second bearings supporting said common rotary shaft, said first bearing being closer than the second bearing to the propellant pump, and said second bearing being closer than the first bearing to the turbine; and
at least one dynamic sealing gasket around the common rotary shaft interposed between said first and second bearings,
wherein said second bearing is a hydrodynamic bearing connected to a gas supply source so that no seal is interposed between the second bearing and the turbine.
2. The turbopump according to claim 1, wherein said propellant pump is a cryogenic fluid pump.
3. The turbopump according to claim 1, wherein said dynamic sealing gasket is connected to a source of inert fluid.
4. The turbopump according to claim 1, wherein said first bearing is connected to the propellant pump to lubricate the first bearing with fluid coming from the propellant pump.
5. The turbopump according to claim 4, wherein said first bearing is a rolling bearing.
6. The turbopump according to claim 4, further comprising:
an auxiliary pump to exhaust said fluid from the first bearing.
7. The turbopump according to claim 4, wherein said common rotary shaft adopts a rest position in which a facial contact seal is closed around the common rotary shaft, and is movable in a movement axially from said rest position to a working position in which said facial contact seal is open, the movement being against a return force exerted by at least one resilient element.
8. The turbopump according to claim 7, wherein said propellant pump presents an axial admission passage situated at an end of said propellant pump that is remote from said first bearing, and said working position is situated towards the propellant pump relative to said rest position.
9. The turbopump according to claim 8, wherein, in said working position, an axial element secured to the common rotary shaft but free to rotate relative to the common rotary shaft comes into abutment, towards the propellant pump, against a stator secured to a casing of the turbopump.
10. The turbopump according to claim 8, wherein, in said rest position, an axial element secured to the common rotary shaft comes into abutment, towards the turbine, against a stator secured to a casing of the turbopump.
11. The turbopump according to claim 1, wherein said gas supply source for the hydrodynamic bearing is the turbine.
12. An assembly, comprising:
the turbopump according to claim 1; and
a propulsion chamber,
wherein said gas supply source for the hydrodynamic bearing is an outlet from a regenerative circuit of the propulsion chamber.
13. A rocket engine, comprising:
at least one propulsion chamber; and
the turbopump according to claim 1 to feed at least one propellant to said at least one propulsion chamber.
14. A rocket engine, comprising:
the assembly according to claim 12.
15. A method of using the turbopump according to claim 7, wherein the first bearing is lubricated by the fluid coming from the propellant pump, the method comprising:
preventing, with said facial contact seal, said lubricating fluid from passing towards the dynamic sealing gasket and the second bearing when the turbopump is stopped; and
opening said facial contact seal by axial movement of the common rotary shaft when the turbopump is started.

* * * * *